(12) United States Patent
Campe et al.

(10) Patent No.: US 12,345,237 B2
(45) Date of Patent: Jul. 1, 2025

(54) WIND TURBINE WITH A ROTOR BEARING HAVING CHANNELS

(71) Applicants: THYSSENKRUPP ROTHE ERDE GERMANY GMBH, Dortmund (DE); THYSSENKRUPP AG, Essen (DE); SIEMENS GAMESA RENEWABLE ENERGY A/S, Brande (DK)

(72) Inventors: Björn Campe, Lippetal-Schoneberg (DE); Gunther Elfert, Erwitte (DE); Jörg Rollmann, Lippstadt (DE); Bernd Lüneburg, Mülheim an der Ruhr (DE); Stephan Froning, Schwerte (DE); Simone Angelo Santoro, Lippstadt (DE); Yevgeni Sharypkin, Lippstadt-Bad Waldliesborn (DE); Kim Thomsen, Skørping (DK); Alejandro Cerda Varela, Copenhagen East (DK); Niels Karl Frydendal, Herning (DK); Morten Thorhauge, Ry (DK); Henrik Gyldenlev Mortensen, Vildbjerg (DK)

(73) Assignees: THYSSENKRUPP ROTHE ERDE GERMANY GMBH, Dortmund (DE); THYSSENKRUPP AG, Essen (DE); SIEMENS GAMESA RENEWABLE ENERGY A/S, Brande (DK)

( * ) Notice: Subject to any disclaimer, the term of this patent is extended or adjusted under 35 U.S.C. 154(b) by 25 days.

(21) Appl. No.: 17/922,078

(22) PCT Filed: Apr. 26, 2021

(86) PCT No.: PCT/EP2021/060826
§ 371 (c)(1),
(2) Date: Oct. 28, 2022

(87) PCT Pub. No.: WO2021/219542
PCT Pub. Date: Nov. 4, 2021

(65) Prior Publication Data
US 2023/0167808 A1    Jun. 1, 2023

(30) Foreign Application Priority Data
Apr. 28, 2020    (EP) .................................... 20171844

(51) Int. Cl.
*F03D 80/70*    (2016.01)
*F16C 17/10*    (2006.01)
(Continued)

(52) U.S. Cl.
CPC ........... *F03D 80/70* (2016.05); *F03D 80/703* (2023.08); *F03D 80/709* (2023.08); *F16C 17/10* (2013.01);
(Continued)

(58) Field of Classification Search
CPC ...... F03D 80/70; F03D 80/703; F03D 80/709; F03D 80/701; F05B 2240/50;
(Continued)

(56) References Cited

U.S. PATENT DOCUMENTS

| | | | |
|---|---|---|---|
| 2014/0029882 A1 | 1/2014 | Palmer | |
| 2015/0098825 A1* | 4/2015 | Wendeberg | F03D 80/70 416/174 |
| 2020/0040941 A1* | 2/2020 | Lüneburg | F16C 32/0666 |

FOREIGN PATENT DOCUMENTS

| | | |
|---|---|---|
| DE | 10 2017 105577 A1 | 9/2018 |
| WO | WO-2009/049755 A1 * | 4/2009 |

OTHER PUBLICATIONS

English machine translation of WO-2009/049755-A1, Nov. 15, 2024.*

(Continued)

*Primary Examiner* — Christopher Verdier
(74) *Attorney, Agent, or Firm* — The Dobrusin Law Firm, P.C.; Daniela M. Thompson-Walters

(57) ABSTRACT

CLEAN A wind turbine (100) with a rotor bearing (1) is proposed, wherein drainage chambers (7) on both sides of the rotor bearing (1) are connected to each other via a plurality of channels (5) traversing an outer ring (2) of the rotor bearing (1), which are distributed over the circumference of the outer ring (2) and that an axis (A) of the rotor bearing (1) is arranged at an angle in the range of 2° to 100 to the horizontal line (H) for promoting a flow of leakage oil through the channels (5).

20 Claims, 2 Drawing Sheets

(51) Int. Cl.
| | |
|---|---|
| *F16C 19/38* | (2006.01) |
| *F16C 19/54* | (2006.01) |
| *F16C 21/00* | (2006.01) |
| *F16C 33/58* | (2006.01) |
| *F16C 33/66* | (2006.01) |
| *F16C 33/78* | (2006.01) |

(52) U.S. Cl.
CPC .......... *F16C 19/386* (2013.01); *F16C 19/545* (2013.01); *F16C 19/548* (2013.01); *F16C 21/00* (2013.01); *F16C 33/586* (2013.01); *F16C 33/6637* (2013.01); *F16C 33/664* (2013.01); *F16C 33/6659* (2013.01); *F16C 33/6685* (2013.01); *F16C 33/7813* (2013.01); *F05B 2240/50* (2013.01); *F05B 2240/54* (2013.01); *F05B 2240/57* (2013.01); *F05B 2260/98* (2013.01); *F16C 2240/30* (2013.01); *F16C 2300/14* (2013.01); *F16C 2360/31* (2013.01)

(58) Field of Classification Search
CPC .............. F05B 2240/54; F05B 2260/98; F16C 33/6637; F16C 33/6659; F16C 33/6685; F16C 33/664; F16C 19/545; F16C 19/548; F16C 37/007; F16C 2360/31; F16C 17/10; F16C 19/386; F16C 21/00; F16C 33/586; F16C 33/7813; F16C 2240/30; F16C 2300/14
See application file for complete search history.

(56) References Cited

OTHER PUBLICATIONS

International Search Report and Written Opinion dated Jun. 24, 2021, Application No. PCT/EP2021/060826.
European Search Report dated Oct. 20, 2020, Application No. 20171844.2.

* cited by examiner

WIND TURBINE WITH A ROTOR BEARING HAVING CHANNELS

PRIOR ART

The present invention is based on a wind turbine comprising a rotor bearing.

Wind turbines typically comprise rotor bearings, which on the one hand transfer forces and torques of the rotor of the wind turbine via a nacelle into the tower and foundation of the wind turbine and on the other hand enable torque transmission into the wind turbine's generator. The rotor bearings typically have an inner ring and an outer ring, which are rotatable with respect to one another. One of the rings is fixedly connected to the nacelle and the other ring is connected to the blades of the wind turbine and to the generator of the wind turbine. The inner ring and outer ring are arranged coaxially and are connected to each other so that they can rotate relative to each other about an axis of rotation running in an axial direction.

For long-term reliable operation of the wind turbine, it is necessary to lubricate and cool bearing elements arranged between the inner ring and the outer ring, which allow the outer ring to rotate.

One way of ensuring lubrication and cooling is to introduce oil into a bearing inner space between the outer ring and the inner ring, which is typically sealed with a sealing arrangement. Despite the sealing arrangement, unavoidable leakage occurs. The oil that escapes through the leakage must be returned. This is usually done with active pumps, but if the pumps fail, this can lead to unwanted oil loss from the wind turbine. In particular, the return of leakage oil from the rotor side in rotor bearings with a turning outer ring fixed to the rotor is complicated since the leakage oil has to be pumped through the hub to the nacelle side.

DISCLOSURE OF THE INVENTION

It is a purpose of the present invention to provide a wind turbine which does not suffer from the disadvantages of the state of the art described above, but reduces the risk of oil loss on and simplifies the return of leakage oil from the rotor side of the rotor bearing.

This is solved by a wind turbine with a tower, a nacelle fixed to the tower and a rotor rotatably mounted on the nacelle via a rotor bearing, the rotor bearing comprising an inner ring, an outer ring, wherein the outer ring is connected to the rotor and the inner ring is connected to the nacelle, wherein the inner and the outer ring together delimit an inner bearing space, and sealing arrangements for sealing the inner bearing space on a nacelle side and a rotor side of the rotor bearing, wherein the sealing arrangements each comprise at least two seals, between which a drainage chamber for collecting leakage oil is formed, wherein the drainage chambers on both sides of the rotor bearing are connected to each other via a plurality of channels traversing the outer ring, which are distributed over the circumference of the outer ring and wherein an axis of the rotor bearing is arranged at an angle in the range of 2° to 10° to the horizontal line for promoting a flow of leakage oil through the channels to the nacelle side of the rotor bearing.

The wind turbine according to the invention provides a possibility to safely return leaked oil to an oil reservoir without active pumps. The leaking oil is collected in the drainage chamber and guided through the channels to the nacelle side of the rotor bearing, where an oil reservoir can be situated. The oil flow through the channels is supported by the inclined position of the rotor bearing. The axis of the rotor bearing in the sense of the present invention is the axis of rotation of the rotor bearing.

Preferred embodiments and further adaptations of the invention are deducible from the dependent claims as well as from the description with reference to the drawings.

In accordance with a preferred embodiment of the present invention, it is provided that the channels extend substantially in the axial direction of the rotor bearing. With the channels extending substantially in the axial direction, the length of the channels that the oil has to pass through is shortened. Moreover, the inclination of the rotor bearing leads to a corresponding inclination of the channels as they extend in axial direction. The axial direction in the sense of the present invention is arranged parallel to the axis of rotation of the rotor bearing.

In accordance with another preferred embodiment of the present invention, it is provided that the nacelle side of the rotor bearing is at one axial end of the rotor bearing and the rotor side is at the opposite axial end of the rotor bearing. In other words, the channels are arranged such, that the leakage oil is transported through the rotor bearing in axial direction. Preferably, the wind turbine comprises an oil reservoir at the nacelle side of the rotor bearing.

In accordance with another preferred embodiment of the present invention, it is provided that the inner ring is equipped with an oil collecting ring having an outlet, wherein the oil collecting ring at least partly wraps around the outer ring in order to collect oil emanating from the ends of the channels in the turning outer ring. Preferably, the oil collecting ring is arranged at the nacelle side of the rotor bearing. It is herewith possible to avoid a loss of oil at the nacelle side of the rotor bearing when the outer ring is in motion. Preferably, the oil collecting ring comprises a further seal. Preferably, the further seal seals an oil collecting chamber, which is formed between the oil collecting ring and the outer ring. Preferably, the channels open into the oil collecting chamber. The oil collecting chamber preferably has a connection to an oil reservoir.

In accordance with another preferred embodiment of the present invention, it is provided that the inner ring and the outer ring are in contact with each other via sliding surfaces that are arranged within the inner bearing space. It is herewith possible that the rotor bearing is a fluid film bearing.

In accordance with another preferred embodiment of the present invention, it is provided that at least one raceway is formed on each of the inner and the outer ring and at least one row of rolling elements capable of rolling off on the raceways is arranged within the inner bearing space. It is herewith possible that the rotor bearing is a rolling bearing.

Preferably, the rotor bearing is a hybrid bearing, i.e. the inner ring and the outer ring are in contact with each other via sliding surfaces that are arranged within the inner bearing space and at least one raceway is formed on each of the inner and the outer ring and at least one row of rolling elements capable of rolling off on the raceways is arranged within the inner bearing space.

In accordance with another preferred embodiment of the present invention, it is provided that the inner bearing space contains oil for lubrication. Preferably, the wind turbine comprises a cooling system for cooling the oil. Preferably, the wind turbine comprises a pump which builds up oil pressure in the inner bearing space. Preferably, the wind turbine comprises a further pump to transport leakage oil back in the inner bearing space.

In accordance with another preferred embodiment of the present invention, it is provided that the rotor bearing is a taper roller bearing or a three-row roller bearing. This type of bearing is very well suited for use in wind turbines. The bearing arrangement ensures that both axial and radial forces are well absorbed.

Further details, features and advantages of the invention can be found in the drawings, as well as in the following description of preferred embodiments based on the drawings. The drawings illustrate only exemplary embodiments of the invention, which do not restrict the essential spirit of the invention.

SHORT DESCRIPTION OF THE DRAWINGS

EMBODIMENTS OF THE INVENTION

In the figures, identical parts are always provided with the same reference marks and are therefore usually referred to only once.

Figure 1:
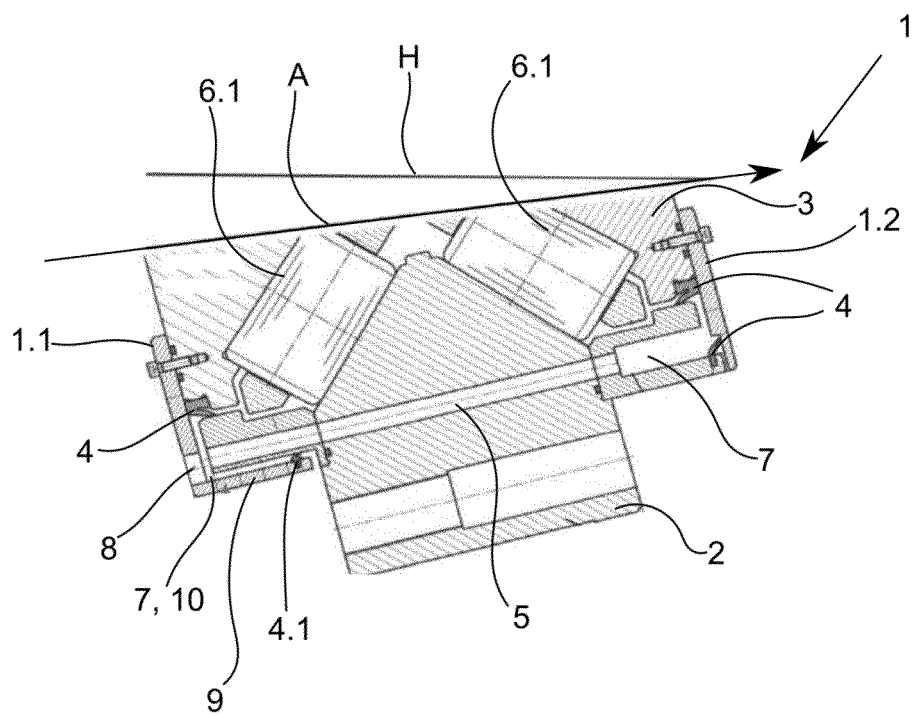
FIG. 1 shows a schematic illustration of a rotor bearing of a wind turbine according to an exemplary embodiment of the present invention.

FIG. 1 shows a schematic illustration of a rotor bearing 1 of a wind turbine (see FIG. 3) according to an exemplary embodiment of the present invention. Here, the rotor bearing 1 is a rolling bearing with two rows of rolling elements 6.1 The rolling elements 6.1 allow a rotational movement between an inner ring 3 of rotor bearing 1 and an outer ring 2 of rotor bearing 1 around an axis of rotation A of rotor bearing 1, which is also an axial direction A.

To ensure long life and safe operation of the rotor bearing 1, an inner bearing space contains an oil. The oil is pumped under pressure into the inner bearing space and lubricates and cools the rolling elements 6.1, the outer ring 2 and the inner ring 3. For this purpose, the inner bearing space is sealed by a sealing arrangement 4 at a rotor side 1.2 and at a nacelle side 1.1 opposite the rotor side 1.2 in axial direction A.

Despite the sealing arrangement 4, oil may leak. At the rotor side 1.2 as well as at the nacelle side 1.1 of the rotor bearing 1, sealed drainage chambers 7 are arranged by the sealing arrangement 4. In the drainage chambers 7 oil is collected, which has leaked from the inner bearing space. To drain the oil from the drainage chambers 7, channels 5 are arranged around the circumference of the outer ring 2 in axial direction A, which connect the drainage chambers 7 on the rotor side 1.2 with the drainage chambers 7 on the nacelle side 1.1. The channels 5 have a diameter of preferably at least 10 mm. The channels 5 may or may not be equally distributed over the circumference of the outer ring 2.

The rotor bearing 1 is inclined by 2° to 10° to the horizontal line H in relation to its axis of rotation A. This leads to the effect that the oil flow through the channels 5 from the rotor side 1.2 drainage chambers 7 to the nacelle side 1.1 drainage chambers 7 is supported by gravity.

In order to collect the oil flowing through the channels 5 on the nacelle side 1.1 even when the outer ring 2 is rotating, the inner ring 3 has an oil collection ring 9. The oil collecting ring 9 partially embraces the outer ring 2 to collect the oil flowing from the channels 5. Another seal 4.1 together with the oil collecting ring 9 and the outer ring 2 forms an oil collecting chamber 10. In the figure shown here, the oil collecting chamber 10 is also the nacelle side 1.1 drainage chamber 7.

From the oil collection chamber 10 the oil can flow through an outlet 8 into a nacelle side 1.1 oil reservoir.

Figure 2:
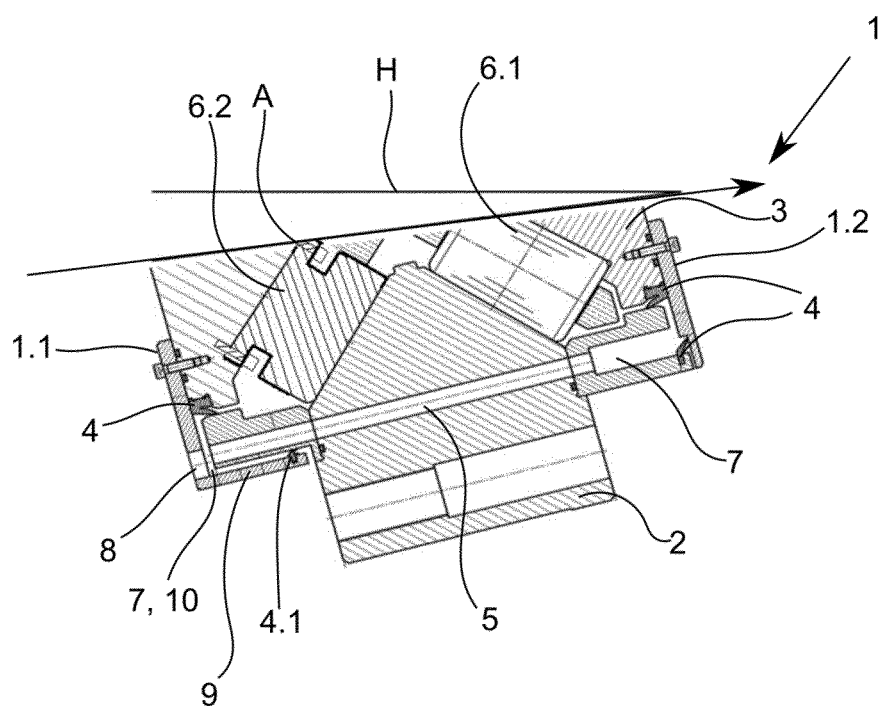
FIG. 2 shows a schematic illustration of a rotor bearing of a wind turbine according to another exemplary embodiment of the present invention.

FIG. 2 shows a schematic illustration of a rotor bearing 1 of a wind turbine (see FIG. 3) according to another exemplary embodiment of the present invention. In contrast to the preferred embodiment shown in FIG. 1, the rotor bearing 1 here is a hybrid bearing. The rotor bearing 1 comprises a rolling element 6.1 and a sliding surface 6.2. It is also conceivable that the rotor bearing 1 is also designed as a pure sliding bearing without rolling elements 6.1 and only comprises sliding surfaces 6.2 instead.

Figure 3:
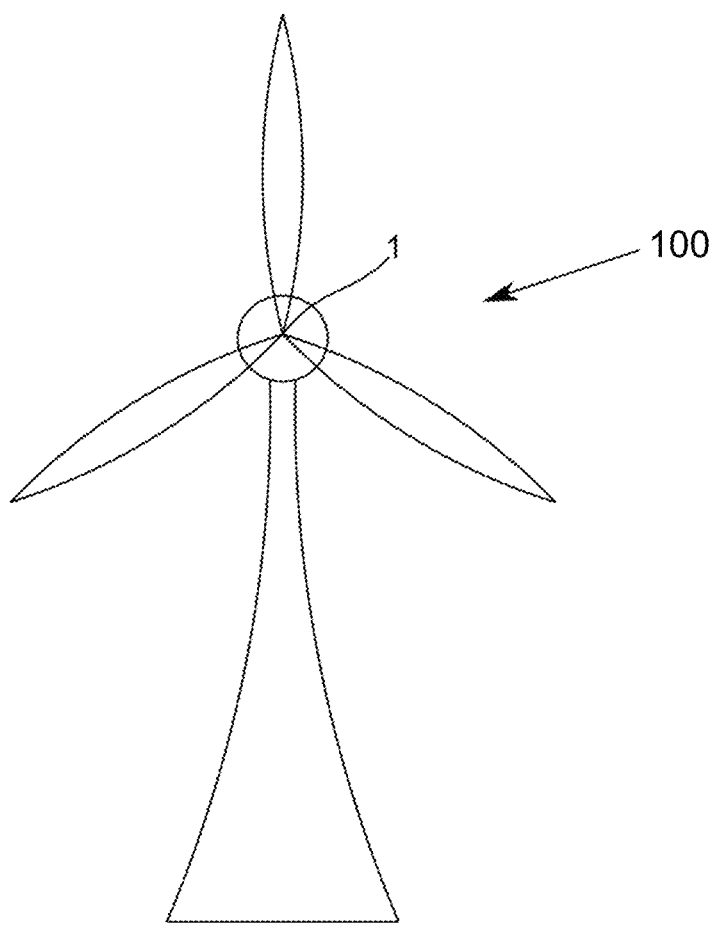
FIG. 3 shows a wind turbine according to an exemplary embodiment of the present invention.

FIG. 3 shows a wind turbine 100 according to an exemplary embodiment of the present invention.

LIST OF REFERENCE NUMBERS 1 rotor bearing
1.1 nacelle side
1.2 rotor side
2 outer ring
3 inner ring
4 sealing arrangement
4.1 further seal
5 channel
6.1 rolling element
6.2 sliding surface
7 drainage chamber
8 outlet
9 collecting ring
10 oil collecting chamber
100 wind turbine
A axial direction/axis of rotation
H horizontal line

The invention claimed is:

1. A wind turbine with a tower, a nacelle fixed to the tower, and a rotor rotatably mounted on the nacelle via a rotor bearing, the rotor bearing comprising:
   a) an inner ring which is connected to the nacelle, wherein the inner ring is equipped with an oil collecting ring having an outlet;
   b) an outer ring which is connected to the rotor, and wherein the inner ring and the outer ring together delimit an inner bearing space; and
   c) a plurality of sealing arrangements which seal the inner bearing space on a nacelle side of the rotor bearing and a rotor side of the rotor bearing;
   wherein the plurality of sealing arrangements each comprise at least two seals, between which a drainage chamber for collecting a leakage oil is formed;
   wherein the drainage chambers on both sides of the rotor bearing are connected to each other via a plurality of channels traversing the outer ring, which are distributed over a circumference of the outer ring, and in that an axis of the rotor bearing is arranged at an angle in a range of 2° to 10° to a horizontal line for promoting a flow of the leakage oil through the plurality of channels to the nacelle side of the rotor bearing; and
   wherein the oil collecting ring at least partly wraps around the outer ring.

2. The wind turbine according to claim 1, wherein the plurality of channels extend in an axial direction of the rotor bearing.

3. The wind turbine according to claim 1, wherein the nacelle side of the rotor bearing is at one axial end of the rotor bearing and the rotor side is at an opposite axial end of the rotor bearing.

4. The wind turbine according to claim 1,
wherein the oil collecting ring at least partly wraps around the outer ring in order to collect oil emanating from ends of the plurality of channels in the outer ring when the outer ring is turning.

5. The wind turbine according to claim 1, wherein the inner ring and the outer ring are in contact with each other via a plurality of sliding surfaces that are arranged within the inner bearing space; and/or
wherein at least one raceway is formed on each of the inner ring and the outer ring, and wherein at least one row of rolling elements capable of rolling off on the at least one raceway of each of the inner ring and the outer ring is arranged within the inner bearing space.

6. The wind turbine according to claim 5, wherein the at least one raceway is formed on each of the inner ring and the outer ring; and
wherein the at least one row of rolling elements capable of rolling off on the at least one raceway of each of the inner ring and the outer ring is arranged within the inner bearing space.

7. The wind turbine according claim 1, wherein the inner bearing space contains oil for lubrication.

8. The wind turbine according to claim 6, wherein the rotor bearing is a taper roller bearing or a three-row roller bearing.

9. A wind turbine with a tower, a nacelle fixed to the tower, and a rotor rotatably mounted on the nacelle via a rotor bearing, the rotor bearing comprising:
a) an inner ring which is connected to the nacelle, wherein the inner ring is equipped with an oil collecting ring having an outlet;
b) an outer ring which is connected to the rotor, and wherein the inner ring and the outer ring together delimit an inner bearing space; and
c) a plurality of sealing arrangements which seal the inner bearing space on a nacelle side of the rotor bearing and a rotor side of the rotor bearing;
wherein the plurality of sealing arrangements each comprise at least two seals, between which a drainage chamber for collecting a leakage oil is formed;
wherein the drainage chambers on both sides of the rotor bearing are connected to each other via a plurality of channels traversing the outer ring, which are distributed over a circumference of the outer ring, and in that an axis of the rotor bearing is arranged at an angle in a range of 2° to 10° to a horizontal line for promoting a flow of the leakage oil through the plurality of channels to the nacelle side of the rotor bearing;
wherein the oil collecting ring at least partly wraps around the outer ring in order to collect oil emanating from ends of the plurality of channels in the outer ring when the outer ring is turning; and
wherein the plurality of channels extend in an axial direction of the rotor bearing.

10. The wind turbine according to claim 9, wherein the nacelle side of the rotor bearing is at one axial end of the rotor bearing and the rotor side is at an opposite axial end of the rotor bearing.

11. The wind turbine according to claim 10, wherein the inner ring and the outer ring are in contact with each other via a plurality of sliding surfaces that are arranged within the inner bearing space.

12. The wind turbine according to claim 9, wherein at least one raceway is formed on each of the inner ring and the outer ring; and
wherein at least one row of rolling elements is arranged within the inner bearing space; and
wherein the at least one row of rolling elements are configured to roll off the at least one raceway of each of the inner ring and the outer ring.

13. The wind turbine according to claim 12, wherein the rotor bearing is a taper roller bearing or a three-row roller bearing.

14. The wind turbine according claim 9, wherein the inner bearing space contains the oil for lubrication.

15. A rotor bearing comprising:
a) an inner ring equipped with an oil collecting ring having an outlet;
b) an outer ring, wherein the inner ring and the outer ring together delimit an inner bearing space; and
c) a plurality of sealing arrangements which seal the inner bearing space on one axial end of the rotor bearing and at an opposite axial end of the rotor bearing;
wherein the plurality of sealing arrangements each comprise at least two seals, between which a drainage chamber for collecting leakage oil is formed;
wherein the drainage chambers on both sides of the rotor bearing are connected to each other via a plurality of channels traversing the outer ring, which are distributed over a circumference of the outer ring, and in that an axis of the rotor bearing is arranged at an angle in a range of 2° to 10° to a horizontal line for promoting a flow of the leakage oil through the plurality of channels to the axial end of the rotor bearing; and
wherein the oil collecting ring at least partly wraps around the outer ring in order to collect oil emanating from ends of the plurality of channels in the outer ring when the outer ring is turning.

16. The rotor bearing according to claim 15, wherein the plurality of channels extend in an axial direction of the rotor bearing.

17. The rotor bearing according to claim 15, wherein the inner ring and the outer ring are in contact with each other via a plurality of sliding surfaces that are arranged within the inner bearing space.

18. The rotor bearing according to claim 15, wherein at least one raceway is formed on each of the inner ring and the outer ring; and
wherein at least one row of rolling elements is arranged within the inner bearing space; and
wherein the at least one row of rolling elements are configured to roll off the at least one raceway of each of the inner ring and the outer ring.

19. The rotor bearing according to claim 15, wherein the rotor bearing is configured to rotatably mount a rotor to a nacelle of a wind turbine;
wherein the wind turbine includes a tower, the nacelle fixed to the tower, and the rotor rotatably mounted to the nacelle; and
wherein the one axial end of the rotor bearing is a nacelle side of the rotor bearing and the opposite axial end of the rotor bearing is a rotor side.

20. The rotor bearing according to claim 15, wherein the inner bearing space contains the oil for lubrication.

* * * * *